(12) United States Patent
Hong

(10) Patent No.: US 6,551,207 B2
(45) Date of Patent: Apr. 22, 2003

(54) AUTOMATIC MULTI-LEVEL TRANSMISSION FOR A VEHICLE

(76) Inventor: Sun T. Hong, 5225 Malrern Ave. #F, Los Angeles, CA (US) 90621

( * ) Notice: Subject to any disclaimer, the term of this patent is extended or adjusted under 35 U.S.C. 154(b) by 0 days.

(21) Appl. No.: 09/880,645

(22) Filed: Jun. 14, 2001

(65) Prior Publication Data

US 2002/0193200 A1 Dec. 19, 2002

(51) Int. Cl.[7] .......................... F16H 3/72; F16H 47/08; F16H 48/06
(52) U.S. Cl. .............................. 475/5; 475/53; 475/221
(58) Field of Search ..................... 475/5, 8, 9, 221, 475/230, 36, 53

(56) References Cited

U.S. PATENT DOCUMENTS

| | | | | |
|---|---|---|---|---|
| 1,870,076 A | * | 8/1932 | Thomson | 475/5 X |
| 1,909,801 A | * | 5/1933 | Basart | 475/5 |
| 2,428,164 A | * | 9/1947 | Jandasek | 475/53 X |
| 2,682,786 A | * | 7/1954 | Finn | 475/36 |
| 3,659,480 A | * | 5/1972 | Koivunen | 74/695 |
| 3,870,116 A | * | 3/1975 | Seliber | 180/54 R |
| 3,924,489 A | * | 12/1975 | Yasuda | 74/688 |
| 4,117,745 A | * | 10/1978 | Yokoyama et al. | 74/687 |
| 4,825,721 A | * | 5/1989 | Gabriele | 74/675 |
| 4,913,002 A | * | 4/1990 | Fellows | 475/53 X |
| 4,964,843 A | * | 10/1990 | Wahl | 475/34 |
| 5,427,196 A | * | 6/1995 | Yamaguchi et al. | 180/65.2 |
| 5,484,344 A | * | 1/1996 | Ra et al. | 475/59 |
| 6,371,878 B1 | * | 4/2002 | Bowen | 475/5 |

* cited by examiner

*Primary Examiner*—Charles A. Marmor
*Assistant Examiner*—Roger Pang

(57) ABSTRACT

The present invention relates to the automatic transmission in general, and in particular to the speed of the car automatically converting according to the difference of the turbine runner's torque gained from the engine, and the load transmitted to the ring gear of the gear reduction device. Further, utilizing the energy of the electricity. To achieve this objective and others, the present invention is comprised of the following: differential gear device activated according to the rotation of the input power axle; gear reduction device reducing the rotation from the differential gear device; control device restricting and controlling the power of the differential gear device and the gear reduction device; torque convertor converting the power of the input power axle and transmitting it to the gear reduction device; electromotor and/or generator recharging the battery as well as reduction ring gear as the motion of pressing on the brake pedal connects the stator's contact to electric load device or increasing the speed of the high speed traveling vehicle by supplying the energy of the battery to the stator and the rotor.

3 Claims, 2 Drawing Sheets

AUTOMATIC MULTI-LEVEL TRANSMISSION FOR A VEHICLE

FIELD OF THE INVENTION

The present invention relates to an automobile transmission in general, and in particular to an automatic transmission converting the speed of a vehicle according to the load transmitted to the output power axle of the gear reduction device.

BACKGROUND OF THE INVENTION

Prior devices utilized the method of attaching a pump impeller to the input shaft, a turbine runner to the output shaft, and several gear reduction devices next to the output shaft. The rotation of the input shaft rotated the output shaft and its corporate rotation rotated the turbine runner. Here, the rotational force transmitting path of the gear reduction device converts the speed of a vehicle to the usual third (3rd) and/or fourth (4th) gear according to the travelling speed of a vehicle.

In order to achieve three (3) or four (4) different gears conversion of a vehicle, prior devices had to equip its transmissions with complex oil pressured devices to attach and/or detach parts of gears. Further, additional accessory devices were needed to monitor the speed and the load to change the programmed gear device in each stages. Furthermore, many more complex devices are installed to obtain the smooth transmission between conversions without abrupt impacts.

In the event of braking and/or speed reduction, pressing on the brake pedal causes a frictional brake to apply pressures onto the disk to reduce the speed of a vehicle. Further, it causes the lining of the brake to wear out. The repeated braking will cause: quick disk wear outs. Thus, a frictional braking is known to be an inferior method to an engine brake.

SUMMARY OF THE INVENTION

The present invention is an automatic transmission of a vehicle comprising of a differential gear device wherein said differential gear device comprising of a first planetary gear mounted on a planetary carrier rotated by the force of an input power axle, and a left and a right side gears mounted and interlocked onto a first planet gear to rotate with input power axle; a torque convertor wherein said torque convertor comprising of a pump impeller mounted onto a planetary carrier of the differential gear device, a turbine runner mounted onto a second power axle to be rotated with said pump impeller, and a stator installed having one-way clutch in the middle to retransmit the rotational force of said turbine runner to a pump impeller; a controlling device wherein said controlling device comprising of a multi-plate clutch activated by pressing on the brake pedal installed on the said second power axle, and a one-way clutch installed on the side of said multi-plate clutch to separate the turbine runner from the second power axle in the event of the second power axle rotating at a faster rate than the turbine runner; and a gear reduction device wherein said gear reduction device comprising of a sun gear situated at the end of the first power axle, a second planetary gear joined with the planetary carrier to be interlocked with said sun gear, and a ring gear situated on the second power axle to be wrapped by the left side of said second planetary gear.

First, the change of gear ratio is done automatically according to the load transmitted to the ring gear (13) which is different from the prior inventions. Further, the measuring load system to change the speed in stages is not there, but this makes the self speed changing device simpler and also there are no impact when the change of the speed occurs.

Second, not all the power of the input power axle (1) goes through the torque convertor, but it is designed to activate the torque convertor partially by distributing the power of the differential gear device to assure the transmission of the power. Also the torque convertor acts indirectly as the damper in the event of sudden load while in the course of driving, giving no excessive work to the engine and at the same time non-step gear reduction increases the comfort of driving.

Third, the storage of the battery is possible by converting the heat energy produced from common braking into the electrical energy.

Fourth, while driving, especially down hill, the engine brake is utilized when braking which uses frictional brake becomes unnecessary extending the life of the frictional brake as well as decreasing the braking distance making the driving safer.

Fifth, the fuel efficiency can be achieved by increasing the speed of driving ($D_4$) without particularly increasing the rotational speed of the engine utilizing the function of the electromotor in directly connected status of high speed of driving ($D_3$).

Sixth, in the emergency of the engine trouble, moving the car to a safe place using the battery powered electromotor rotating the shaft, and other advantages as such are possible.

The present invention provides such advantages presented above by having its main object in providing an automobile transmission which converts gear ratios automatically according to the power output of the engine and the road condition. This objective can be achieved by simultaneously transmitting the rotation of the input shaft to the gear reduction device through the differential gear device and the power from the torque converter to the reduction gear device.

It is a further object of this invention to install an electromotor on the reduction gear device to increase the speed of a vehicle as well as fuel efficiency without increasing the revolutions of the engine. Further, achieving superior braking by applying functions of the generated braking and the engine braking simultaneously.

It is an additional object of this invention to achieve the rotation of the output power axle to move the car to the safe place, i.e., side of the road, in circumstances of having an emergency of engine problem and failure.

BRIEF DESCRIPTION OF THE DRAWINGS

Referring now in detail to the two drawings for the purpose of illustrating preferred embodiment of the present invention. The drawings are composed of.

DETAIL DESCRIPTION OF THE DRAWING

Figure 1:
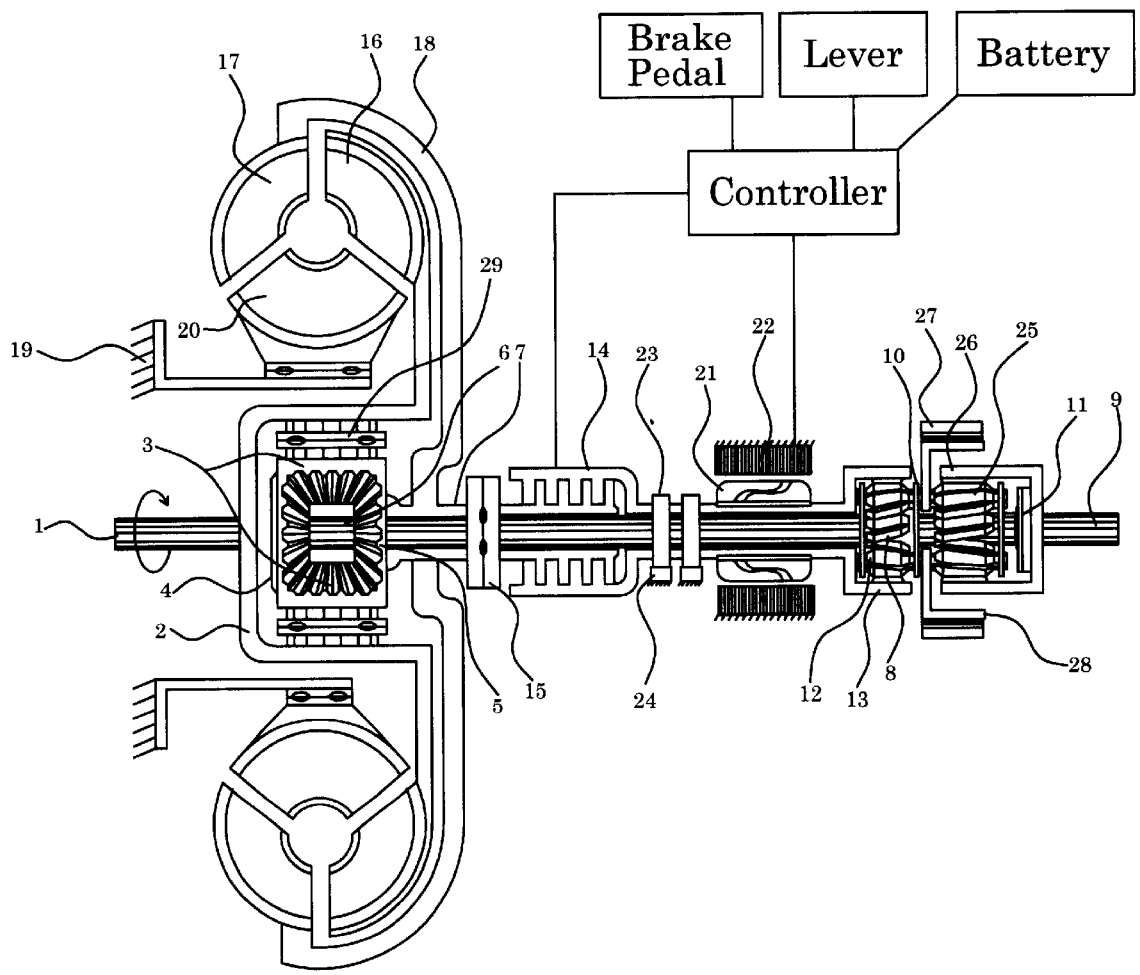
FIG. 1 showing a drawing of a vertically cut view of the present invention.

The present invention is a differential gear device operated by the rotation of an input power axle (1), a reduction gear device reducing the rotation of the differential gear device, a control device controlling power isolation of the differential gear device and the reduction gear device, and a torque convertor supplying the converted power of the input power axle (1) to the reduction gear device.

The differential gear device is combined with several first planetary gears (3) to have permanently installed in a planetary carrier (2) which rotates with the input power axle (1). All these planetary gears are connected to an one-way clutch (29) rotating and turning only in the direction of the arrows in the drawing. Unto the first planetary gear (3), there are a left and a right side gears (4 and 5), respectively, installed onto a first and a second power axle (6, 7) that are interlocked with the first planetary gears (3). Here the first power axle (6) is placed inside the second power axle (7).

Thus, each of the left and the right side gears (4 and 5) are rotated at a different speed according to the loading of the vehicle transmitted from the first and the second power axle (6 and 7) as the first planetary gear (3) revolves around at a steady rate.

The reduction gear device which reduces the rotation of the differential gear device is comprised of a sun gear (8) which is fixed onto the left side gear (4) and the first power axle (6); the sun gear (8) is interlocked with several second planetary gears (12) inside the second planetary carrier (10) which is connected to the output axle and the reverse clutch (11); and a ring gear (13) fixed onto second power axle (7) are interlocked with the second planetary gears (12).

Thus, the sun gear (8) and the ring gear (13) are separately and independently turned as the first and the second power axle (6, 7) are turned by the input power axle (1) rotates, and through these chain of reaction, the second planetary gear (12) moves around and rotates causing the output power axle to turn a reverse gear reduction device.

Reverse clutch (11), third planetary gear (25), and band brake (27) are only operated during the reverse stage, but during the normal forward stage, all these parts come together as one axle and the power of the second planetary gear (12) is transmitted to the output power axle (9).

The power of the differential gear device and the reduction gear device are isolated by the controller and the controller is activated by pressing on the brake pedal (not shown) or the shift lever mechanically disconnecting. To achieve this, a multi-plate clutch (14) is installed onto the outer power axle (7). When a rotor (21) is turning faster than the right side gear (5), an one-way clutch (15) is installed to separate the second power axle (7).

Thus, when the wheels are being restrained by the frictional brake, the motion of pressing on the brake pedal or mechanical movement which separates the multi-plate clutch (14), the power is prevented from transferring to the output power axle (9) due to idling of the reduction gear device.

Torque convertor functions to partially convert the power from the input power axle (1) and connects it to the reduction gear device. Torque convertor comprises of the pump impeller (16) mounted to rotate with the input power axle (1) on the outset of the first planetary carrier (2). A turbine runner (17) is mounted opposite the pump impeller (16) by the housing (18) on the side of the second power axle (7). A stator (20) is situated in between these two devices onto the body of a vehicle (19). Stator functions to transmit the rotational force back to the pump impeller (16) from the turbine runner (17) making the torque conversion possible.

Automatic transmission is possible by forming the device as described above, but the present invention makes improvement. A generator is attached to obtain two improvements of a better and efficient usage of the automatic transmission.

A rotor (21) is affixed to a second power axle (7) which is in between a multi-plate clutch (14) and a ring gear (13). A stator (22) is placed around the rotor (21). A pair of slip ring (23) are fixed to one side of the second power axle (7) and the rotor (21), and it is connected to the rotor (21). On the other side of the slip ring (23), a brush (24) is connected to the slip ring (23) to transfer the power to the rotor (21).

Therefore, shift lever is operated to transfer the power supply of the battery to the stator (22) and the rotor (21). Then the rotor (21) will rotate and as it rotates the second power axle (7) and the ring gear (13) will rotate with increased power. This increased power of the ring gear 15) will cause the rotation of the second planetary carrier (10) to be increased and the gear reduction device functions as gear increasing device.

The power supply, which is supplied to the stator (22) which is installed at the outer of the rotor (21), is linked to the power supply of the rotor (21). Referring to the FIG. 2, it is constructed to be connected to the electrical load contact as the power supply is at off state by the motion of the stepping on the brake pedal. At the state of having the motor running to have the rotor (21) in its rotation, the motion of stepping on the brake pedal is administered. As it is applied, the power supply contact of the stator (22) being at the off state and at the same time, the electrical load contact is connected. As this happens, the generated power currency will occur through the stator (22) and also it will resist on rotating of the rotor (21).

This braking power will brake the ring gear (13) and the ring gear's braking will reduce the second planetary carrier (10) which will function as an engine brake.

Taking a closer look at the electrical circuit of this present invention, it is designed that a direct current electromotor set up at second power axle (7) uses the direct electromotor to function as an electromotor in traveling at overdrive and as a generator in application of an engine brake.

In order for the generated brake to operate continuously, the storage battery is fully charged that no more charging can be done preventing the generated brake from functioning. To prevent such occurring, short circuit is composed, and also in the generated electrical circuit which is alternate current (AC) is converted into the direct current (DC) reaching to the storage battery by going through the rectifier, and the rectifier circuit and short circuit need to be constructed.

This can be readily understood and comprehended by any person in the profession or the same field of the work, so the flow chart showing the above described is omitted.

Figure 2:
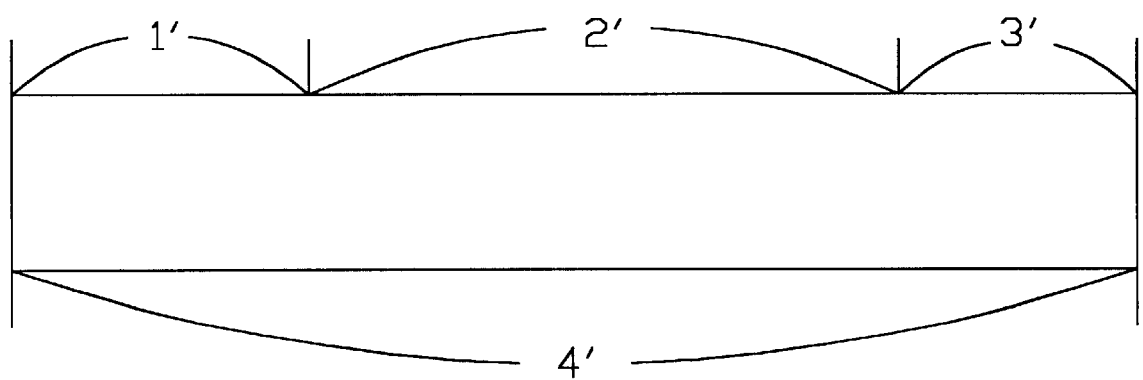
FIG. 2 showing a graph of the changes occurring as the brake pedal is pressed.

As shown in FIG. 2, the brake function is carried out in several levels by pressing on the brake pedal.

Thus, As the motion of the pressing on the brake pedal is carried out, the electricity to the stator (22) is cut off and then the stator (22) is connected to the electrical load/storage battery.

The reason for cutting off the electricity to the stator (22) is that it is used by an electromotor transferring electric current to the stator (22) as it is used in the range of overdrive.

After continual moving of the functions of the generated brake, the multi-plate clutch detaches and the normal frictional brake operates to achieve complete stop of the wheel at the end.

Next to the second planetary carrier (10) of the output power axle (9), the third planetary carrier (28) combines the third planetary gear (25) and connects it to the second planetary carrier (10) through the output power axle (9) with reverse clutch (11). Further, onto the outside of the third planetary gear (25), the ring gear (26) are interlocked as one component and to the outside of the third planet carrier (28); a band brake (27) is set up; and the both of the band brake (27) and the reverse clutch (11) are operated by the reverse lever.

Thus, in normal forward driving the band brake (27) does not restrict the ring gear (26) and the clutch (11) is grasped; the third planetary gears (25) revolve allowing the revolutional movement of the second planetary carrier (10) to be transmitted in direct motion to the output power axle (9). On the other hand, the reduced rotation of the reverse direction of the output power axle (9) occurs as the reverse clutch (11) is released. The revolution of the carrier (28) is restricted by the band brake (27) in the event of the reverse movement.

The function and the effect of the present invention is described in following:

At stop and neutral stages, a multi-plate clutch 14 is detached during the drive, and the driver's motion of pressing on the brake pedal completely detaches the multi-plate clutch (14). At complete stop (P range), the driver starts up the engine which will rotate the input power axle (1) which will created the rotation of the pump impeller (16) of the torque convertor at the same speed as the input power axle (1), and also the revolution of the first planetary gear (3) of the differential gear device is achieved as the rotational force is transmitted to the first planetary carrier (2).

As the first planetary gears (3) revolve around as described above, the left side gear (4) and the right side gear (5) are rotated. Thus the sun gear (8) of the gear reduction which is affixed with the first power axle (6) and the left side gear (4) is rotated as well.

Here, the turbine runner (17) in the housing (18) is rotated as well due to the torque received from the pump impeller (16).

As the sun gear (18) is rotated as above, the output power axle (9) is attached to the load of a vehicle. The second planetary gear (12) which is installed in the planetary carrier (10) cannot revolve, but it just rotates. Due to all these, the ring gear (13) is rotated in reverse, but this reverse rotation fails to affect turbine runner (17) which is rotating to the forward direction since multi-plate clutch (14) is detached due to the mechanical movements.

On the other hand, the turbine runner (17) in the housing 18 receives the torque due to the pump impeller 16 and it rotates, and the whole device of the torque convertor rotates as fly wheel which will continuously rotate from the point of ignition to the turned off state of the engine.

The transmission channels of the above rotational force, Park (P), Neutral (N), and Drive stage (D) are unified as one as the car is stopped by applying force to the brake pedal.

At the state of having the engine idling, following are the processes in moving a vehicle: the multi-plate clutch (14) which was mechanically detached becomes attached (D range); the function of the multi-plate clutch (14) causes the second power axle (7) to be connected gradually making the rotational forces of the turbine runner (17) which was rotation in the forward direction, and the ring gear (13) which was rotating in opposite direction is collided; and the detail description of this occurrence is stated below.

The rotational force of the turbine runner (17) which is turbine's torque, increases in the event where the pump impeller (16) increases as the speed becomes greater compare to the turbine runner (17), and also at the initial stage where the speed of the turbine runner (17) is slow or at the increasing state of the pump impeller (16) due to the fast speed of the engine revolution.

On the other hand, the load of the output power axle (9) which affects the ring gear (13) has the countering rotational power against the output power axle (9) which rotates in the right direction. The force of the load which reaches the second planetary carrier (10) of the output power axle (9) is separated and transmitted to the ring gear (13) and the sun gear (8). At this moment, most of the load goes to the ring gear (13) which has greater number of gears compares to the sun gear (8). The opposite directional load transmitted to the ring gear (13) is same as the reaction force which reaches the ring gear (13) when the rotation of the sun gear (8) is reduced in gears to the second planetary carrier (10).

Thus, the load which functions as reverse direction of the ring gear (13) is as described above as forward direction of the turbine runner's torque collides to bring above variable possibilities of rotation of the ring gear (13) including the forward direction and the stop position.

The status of the rotation of the ring gear (13) is influenced by the load and the torque of the turbine, and as the transmitted load becomes greater or the torque becomes smaller, the ring gear (13) maintains the slow forward or the reverse direction. On the other hand, if the load decreases or the torque increases, the forward direction of the ring gear (13) at increasing speed occurs. Thus,accordance to the rotational status of the ring gear (13), the rotation force of the sun gear (8) is transmitted through the planetary carrier (10) after gear reduction process.

Therefore, even at the same load level the ring gear (13) is at rotation in greater rotation in forward direction when the engine revolution output is high, so the high output is due to the low ratio of the gear reduction.

As the rate of the rotation of the right side gear (5) which is connected to the turbine runner (17) is reduced with loading to ring gear (13), the left side gear (4) of the differential gear device will comparatively increase in speed which increases the rotation of the sun gear (8) of the gear reduction device, but the rotation of the output power axle (9) is not increase due to the rotation of the sun gear (8). It is because the ring gear (13) is already reduced before it is transmitted to the planetary carrier (10).

After continuous execution of the gear reduction due to the load, the maximum speed is maintained without need of the gear reduction. In other words, when reaching the stage where the load transmitted against the output power axle (9) is almost gone, the turbine runner (17) maintains almost same rotational speed as the pump impeller (16), whereas the rotational speed of the right side gear (5) which is rotated by the first planetary gear (3) becomes same as the revolution speed of the first planetary gear (3). The first planetary gear (3) stops rotating and the rotation speed of the left side gear (4) becomes same as the rotation speed of the right side gear (5). The rotation of the second planetary gears (12) which are interlocked to the sun gear (8) and the ring gear (13) are stopped and it only revolution around, and it functions as the direct connector of the same rotation between the rotations of the ring gear (13) and the sun gear (8). These will rotate the second planetary carrier (10) which is connected to the output power axle (9) and the reverse clutch (11).

Therefore, the gear reduction outputing from the second planetary carrier (10) reduces gear according to the load which is transmitted to the power axle (9) and the torque of the turbine runner. The non-step gear ratio is created from the high gear reduction to the point where no reduction occurs as the reverse rotation of the ring gear (13).

Also, in the event where there is a direct connection rotation due to the same rate of rotation of the input power axle (1) and the output power axle (9), the rotation speed of the ring gear (13) can be increased by transferring the electric power source to the rotor (21) and the stator (22) increasing the speed of the ring gear (13) which is rotating in forward direction causing the rotor (21) to rotate at the faster rate than the input power axle (1).

Accordingly the ring gear (13) is rotated at the faster rate than the turbine runner (17), but the turbine runner (17) is rotating at the same rate as the input power axle (1).

This is because the ring gear's (13) rotation is not transmitted to the turbine runner (17) since the one-way clutch (15) is applied to the turbine runner (17).

Above described movement is possible when the energy of the battery is added onto the rotation of the ring gear (13) creating faster rotation of the ring gear (13) compare to the sun gear (8) at the high speed stage ($D_3$). When this occurs the second planetary carrier (10) enters the stage where it rotates at the greater speed of the directly connected rotation which accelerates the output power axle (9). This way the over-drive ($D_4$) of the output power axle (9) is maintained without increasing the rotation of the engine.

At this instance, the rotational force of the ring gear (13) gives the reaction of the opposite directional force to the sun gear (8) which could rotate the left side gear (4) in opposite directionally, and it cause to rotate the first planet gears (3) in opposite direction of the arrow indicated by the FIG. 1 of the drawing. The one-way clutch (29) is made to resist such reaction that electric power accelerates the gear of the planetary carrier (10) by the rotational force of the ring gear (13).

When the load transmitted to the output power axle (9) increases due to the sudden climbing of the hills and such while driving at over-drive stage ($D_4$), the rotation speed of the ring gear (13) decreases that the one-way clutch (15) is again clutched that the adequate reduction of the gear is done as described above.

Also, at stop and during driving, it functions as beginning stage of the driving if the car is operated by moving the lever to $D_4$, and by taking the foot off the brake pedal which reconnects the multi-plate clutch (14). But because of sudden supply of the electrical energy to the ring gear (13) the rotational force is given that ring gear is rotating faster than original speed as described above causing the sudden rotation of the output power axle (9) at a faster rate.

The above function, in the starting stage when the lesser driving force than the wheels' frictional force is necessary, brings the effect of the normal $L_2$ stage in the.event of the icy road condition during the winter season or when the wheel is trapped in the hole.

In this case, the adequate rotational force is supplied according to the road surface condition since the rotation of the ring gear (13) can be adjusted due to the adjustment of the electrical current supplied to the rotor (21).

Also, in the emergency where the car doesn't start due to the sudden breakdown of the engine during driving, the electrical power is supplied onto the rotor (21) and the stator (22) which the prior arts don't have. The device directly drives the ring gear (13) where the rotational force is reduced in gear by going through the second planet gear (12) which rotates the output power axle (9) that the car can be moved to the safe place using only the battery power.

On the other hand, while driving, the act of reducing the speed of the driving by stepping on the brake has different power transmission channel from the gear reduction increasing due to the above automatic transmission.

Thus, the rotation force of the ring gear (13) is reduced by the load of the output power axle (9) going through the planetary carrier (10) with the automatic transmission, but the rotation force of the ring gear (13) in the event of the reduction by braking is reduced by the reduction of the rotor (21).

The electrical power supply to the stator (22) is stopped when the brake pedal is pressed to reduce the speed in over-drive range ($D_4$). After being in the D range the load connection device of the stator (22) is connected when the brake pedal is pressed with more pressure. Accordingly, the rotor (21) continues to rotate due to the inertial force which causes the stator (22) to generate the electrical current.

As described above, the rotation of the rotor (21) is reduced due to generating, and it also causes reduction of the rotation of the ring gear (13) which in turn causing the second planetary carrier (10) to reduce by gear reduction. In description, first the rotation of the right side gear (5) of the differential gear device decreases as the rotation of the ring gear (13) fall down, and thus increasing the rotation of the left side gear (4) which in turn increasing the sun gear (8) of the reduction gear device (4).

Thus, the reduced rotation of the ring gear (13) brings greater speed to the sun gear (8), but the transmitted output to the second planetary carrier (10) goes through the gear reduction.

The reduction on the ring gear (8) due to the generated brake continues until the ring gear (8) comes to a complete stop, thus the output that comes out to the output power axle (9) which goes through the second planetary carrier (10) and the clutch (11) gradually increases the gear ratio of the gear reduction.

The rotational force transmitted to the output power axle (9) in this method is made possible by the motion of pressing on the brake pedal which brakes the ring gear (13) by the generated brake wherein the gear reduction of the second planetary carrier (10) occurs. The above described motion is not the gear reduction due to the gear shift according to the load, but it is the electric powered reduction of the ring gear (13) that activates the engine brake due to the gear reduction of the planetary carrier (10).

Thus, when the brake is pressed to actuate reduction in the course of driving the car (from start to the high speed of $D_4$) the engine brake goes into an action causing reduction which prevents brake failure due to the overheating of the frictional brake which is common and usual disadvantage, and also it prevents sliding in sudden and hard braking. It shortens the braking distance making it safer and it is generally improved overall since the electrical current is gained incidentally.

And at the stage where the driving speed has been reduced the brake pedal is continuously pressed until the car comes to a complete stop. This motion slows the rotation of the output power axle (9) detaching the multi-plate clutch (14), and the frictional brake grabs the disk of the wheel stopping the car making the ring gear (13) to rotate in opposite direction as in the initial stage.

This is achieved because the motion of pressing on the brake pedal causes the multi-plate clutch (14) to detach only allowing the sun gear (8) to rotate.

The operation lever is moved to the reverse (R) position to cause the car to move in backward direction. At the same time as the detachment of the reverse clutch (11) which was connecting the second planetary carrier (10) and the output power axle (9) occurs, the band brake (27) installed to the outside of the carrier (28) restricts the revolution of the carrier (28). The power of the second planetary carrier (10) is transmitted to the ring gear (26) which is attached to the output power axle (9), through the third planet gear (25) reversely rotating the ring gear (26). Accordingly the car move backward as the output power axle (9) rotates in reverse motion.

The output power axle (9) in reverse motion goes through the gear reduction one more time than in forward motion reducing the output of reverse motion compare to output in forward motion. In reverse motion, all the functions such as high speed or stopping, and the automatic transmission are same as in forward motion, but only that the output has reverse direction.

I claim:

1. A differential gear device comprised of:
    a. first planetary gears (3) wherein said first planetary gears are installed in a first planetary carrier (2) which rotates by an input power axle (1), and a left side gear (4) and a right side gear (5) which is affixed on a first power axle (6) and a second power axle (7) which rotates by being interlocked with said first planet gears (3);
    b. a torque convertor wherein said torque convertor is comprised of a pump impeller (16) affixed onto said first planet carrier (2) of said differential gear device and rotating with said input power axle (1); a turbine runner (17) affixed onto said second power axle (7), and activating by said pump impeller (16); a stator (20) placed in the middle of said turbine runner (17) and said pump impeller (16);
    c. a control device wherein said control device is comprised of a multi-plate clutch (14) which activates by the motion of pressing a brake pedal, installed onto said second power axle (7); an one-way clutch (15) installed beside said multi-plate clutch, detaching said turbine runner from said second power axle (7) when it rotates faster than said turbine runner (17);
    d. a reduction gear device wherein said reduction device is comprised of a sun gear (8) affixed at the end of said first power axle (6); second planetary gears (12) interlocked with the sun gear in a planetary carrier (10) of an output power axle (9); a ring gear (13) affixed onto said second power axle (7) wrapping around said second planet gears (12).

2. The automatic transmission according to the claim 1;
    wherein a rotor (21) affixed onto said second power axle (7) positioned in the middle of said multi-plate clutch (14) and said ring gear (13);
    an electromotor comprised of a stator (22) installed around the rotor;
    a contact of said stator (22) is connected to the electric load device as the motion of pressing on the brake pedal which causes the recharging of a battery;
    in over-drive ($D_4$) the power of the battery is supplied to said rotor (21) and said stator (22) by shifting a lever rotating the rotor in forward motion.

3. The automatic transmission according to the claim 2;
    wherein by pressing on the brake pedal, the supply of the power to said stator (22) is ceased, thereby connecting the electric load device, and detaching said multi-plate clutch (14).

* * * * *